UNITED STATES PATENT OFFICE.

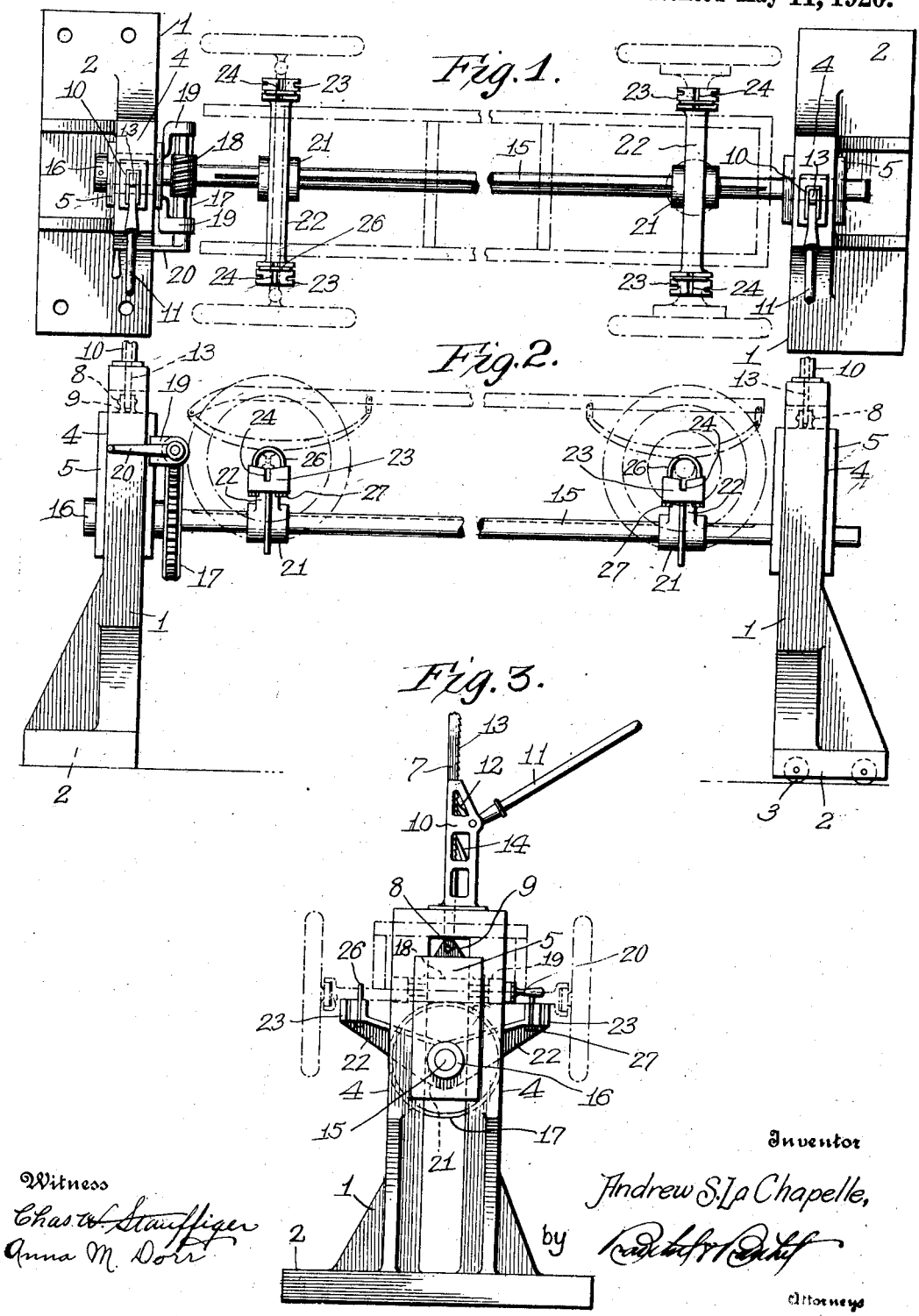

ANDREW S. LA CHAPELLE, OF DETROIT, MICHIGAN.

AUTOMOBILE-JACK.

1,339,459. Specification of Letters Patent. Patented May 11, 1920.

Application filed January 17, 1919, Serial No. 271,554. Renewed March 15, 1920. Serial No. 366,041.

*To all whom it may concern:*

Be it known that I, ANDREW S. LA CHAPELLE, a citizen of the United States of America, residing at Detroit, in the county of Wayne and State of Michigan, have invented certain new and useful Improvements in Automobile-Jacks, of which the following is a specification, reference being had therein to the accompanying drawings.

In inspecting, cleaning and repairing automobiles, it is desirable to be able to elevate them and tilt them at various angles so that any part of the car may be brought within easy reach of the workman. This invention relates to a tilting jack for automobiles whereby a man can readily raise a car to the height desired, and tilt it to any desired angle so as to bring the underside of the chassis into at least a vertical plane and even further if desired, while at the same time the supporting parts are such that free access is had to the car.

The invention consists in the matters hereinafter set forth, and more particularly pointed out in the appended claims.

Figure 1 is a view in side elevation of a mechanism embodying features of the invention;

Fig. 2 is a view in end elevation thereof, and

Fig. 3 is a view in plan.

As showing a preferred form of my invention a pair of supports 1 are provided, each having a base 2 and the base of one support has suitable casters 3. Upright guides 4 on the support act as guides for heads 5 each of which is articulated or swung from a jack bar 7 as by a pivot pin 8 engaging a lug 9 of the head 5. Each bar 7 is part of a jack the frame 10 of which is mounted on the support, a lever 11 with pawl 12 on the teeth 13 of the jack bar to raise and lower it in the usual manner, there being the usual detent 14 and other adjuncts of an ordinary jack.

A shaft 15 is journaled near the ends in each head 5, endwise movement thereof being prevented by suitable collars 16. A worm gear 17 is keyed or otherwise secured to the shaft and is engaged by a worm 18 rotatable in a bearing boss 19 of one of the heads 5, while a handle 20 permits convenient manipulation of the worm. Or other suitable gearing may be mounted on one of the heads whereby the shaft 15 may be turned as desired by a crank or the like.

A pair of cradles 21 are keyed or otherwise made fast to the shaft 15 on which they are longitudinally adjustable so that they may be shifted to underlie the forward and rear axles of any car that it is desired to raise. The cradles having oppositely divergent arms 22 with saddle blocks 23 on the ends that have the upper faces thereof grooved as at 24 or otherwise arranged to receive an axle and clear the transverse brace rods ordinarily used on some constructions. U-bolts or clips 26 engaging the grooved faces of the saddle blocks 23 are used to clamp an applied axle firmly in place by means of nuts 27 or the like.

In operation one end of the shaft may be withdrawn from one of the heads, and thrust beneath the car, the cradles being readily adjustable under the axle when the shaft is replaced in the head with the supports at each end of the car and at a distance therefrom suitable for permitting inspection and adjustment of the end portions of the chassis. By use of the jacks, the car is securely clamped on the cradle is elevated as desired, and then by manipulation of the worm or other gear, is turned as to render any desired portion of the car accessible for inspection and repair. Because of the simplicity of the device it is effective for use in garages and other places as it can be easily shifted into position, while notwithstanding its lightness, it is sufficiently rigid to carry the heaviest of vehicles and one person can readily turn the device into any desired position.

Obviously, changes in the details of construction may be made without departing from the spirit of my invention and I do not care to limit myself to any particular form or arrangement of parts.

What I claim is:

1. A device for the purpose specified, comprising a pair of oppositely disposed supports, heads shiftable up and down the supports, means for raising and lowering the heads on the supports, and axle supporting means connecting the heads in which they are journaled adapted to be turned therein into any angular relation.

2. A device for the purpose specified, comprising a pair of oppositely disposed supports, heads shiftable up and down the supports, means for raising and lowering the heads on the supports, axle supporting means connecting the heads in which they are journaled adapted to be turned therein into any angular position, and means for turning the axle supporting means in the head.

3. A device for the purpose specified, comprising a pair of oppositely disposed supports, having upright guides, heads reciprocable on the guides, means for raising and lowering the heads on the guides, axle supporting means rotatably mounted in the head and means on one of the heads for turning and holding the axle supporting means in any desired angular position.

4. A device for the purpose specified comprising a tire support having upright guides thereon, heads reciprocable in the guides, means on each support for raising and lowering the companion heads to which it is articulated, a shaft journaled in the heads, means on one of the heads engaging the shaft for turning the same in the heads, and axle cradles longitudinally adjustable on the shaft and non-rotatably secured thereto.

5. A device for the purpose specified comprising a pair of wheel supports each having upright guides thereon, a head reciprocable on each support engaging the guides, means on each support articulated to the heads for raising and lowering the latter, a shaft journaled in the heads, gearing on one of the heads connected to the shaft for turning the latter, cradles longitudinally adjustable and non-rotatable on the shaft, and means on the cradle for clamping the axles of an automobile thereon.

6. A device for the purposes specified comprising a pair of supports each provided with a base, upright guide portions on a support, casters carrying one of the supports, heads reciprocable each on the guides of a support, jacking mechanism mounted on each support for raising and lowering the heads, a shaft longitudinally adjustable through and rotatable in the head, manually operable means mounted on one of the heads for rotating the shaft, and a pair of cradles longitudinally adjustable and non-rotatable on the shaft for supporting the axles of an automobile.

7. A device for the purposes specified comprising a pair of upright supports and axle supporting means shiftable bodily up and down in the supports and rotatable thereon, means on the supports for shifting the said means, and means on one of the supports for turning said means into any desired angular position.

In witness whereof I affix my signature in the presence of two witnesses.

ANDREW S. LA CHAPELLE.

Witnesses:
ANNA M. DORR,
CHAS. W. STAUFFIGER.